Nov. 6, 1951  A. BANOVSKY ET AL  2,573,825
MACHINE FOR PRETREATING PLASTIC MATERIALS
Filed March 21, 1947  2 SHEETS—SHEET 1
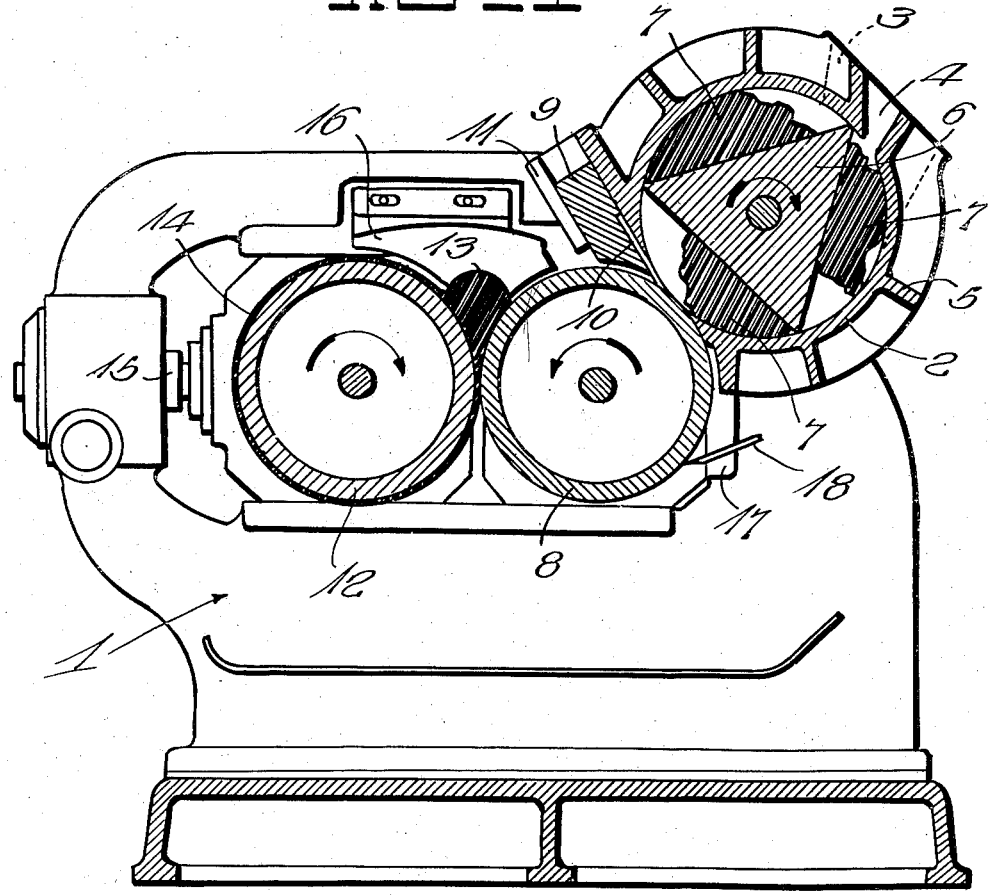
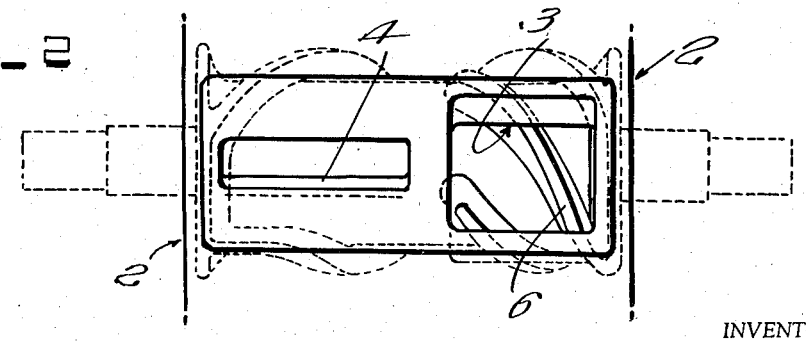
INVENTORS
Alois Banovsky,
Arnost Kruzik,
BY John B. Brady
ATTORNEY

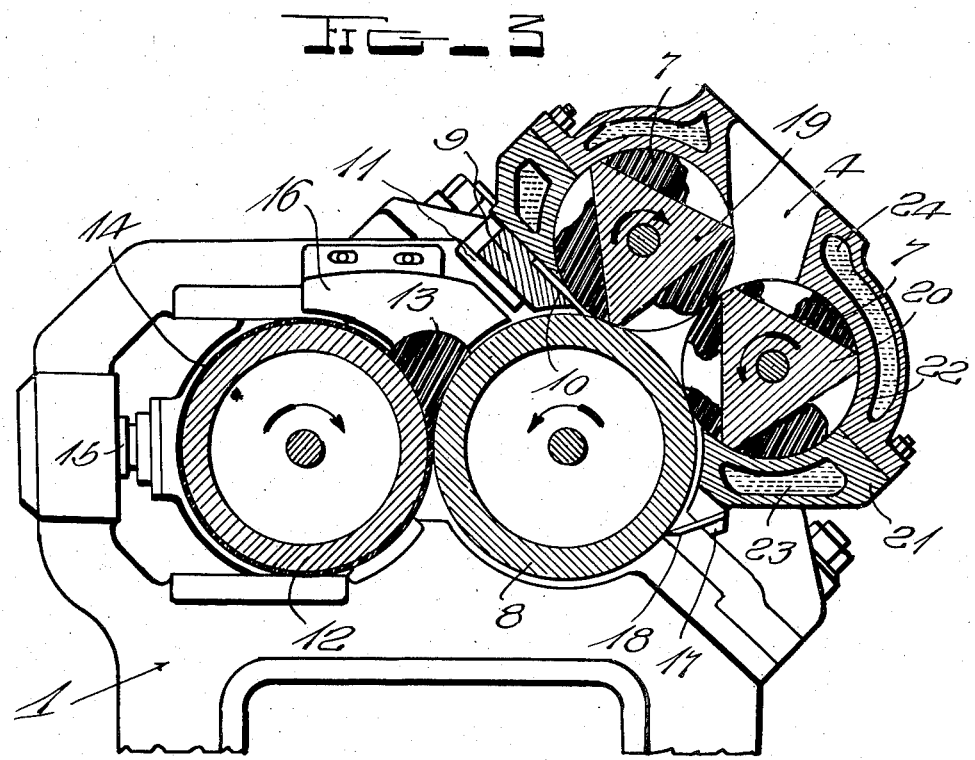
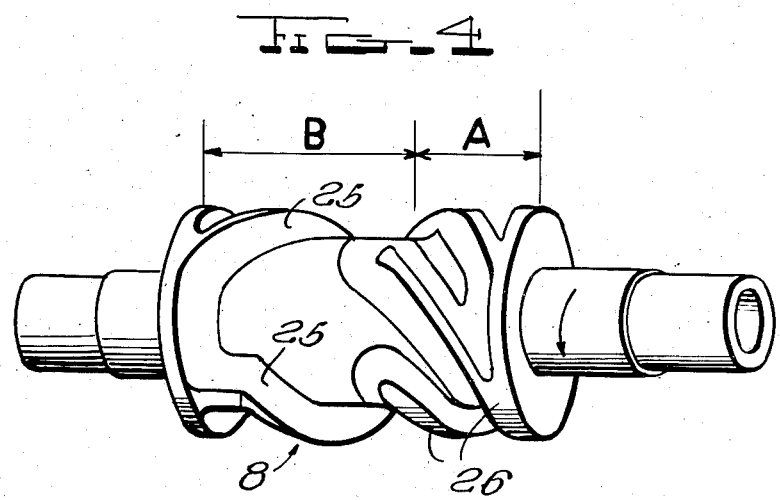

Patented Nov. 6, 1951

2,573,825

UNITED STATES PATENT OFFICE 2,573,825

MACHINE FOR PRETREATING PLASTIC MATERIALS

Alois Bánovský and Arnošt Kružík, Zlin, Czechoslovakia, assignors to Bata, národní podnik, Zlin, Czechoslovakia Application March 21, 1947, Serial No. 736,272
In Germany September 1, 1942

Section 1, Public Law 690, August 8, 1946
Patent expires September 1, 1962

6 Claims. (Cl. 18—2)

This invention relates to machines for the pretreatment of plastic materials, such as natural or artificial rubber, by kneading and mixing.

For the treatment of such plastic materials two kinds of machines were hitherto in general use. An older type consisted of two rollers lying side by side and driven at different velocities. The raw plastic material was inserted, together with filling materials, if any, between the rollers and, after having been thoroughly kneaded, worked and warmed, it emerged as a flat band. The rollers acted on the plastic material by fullering and rubbing so that the material was exposed to continuous changes of shape between the rollers, and was thoroughly mixed and kneaded, whereby, due to the heat developed, a warming of the material took place at the same time. A disadvantage of these machines is that they work comparatively slowly, but on the other hand they are very effective since the plastic masses are neither unnecessarily overheated nor affected in any other detrimental way.

For the purpose of accelerating the pretreatment of plastic materials, particularly of caoutchouc, another machine is generally used which is frequently referred to as a kneading machine. Such a kneading machine consists of a simple trough or multiple troughs with rotating kneading blades into which the appropriately prepared raw material is filled together with additions made for the purpose of a quicker treatment, achieving a greater strength of the objects to be manufactured or only for the purpose of "filling" the mixture. The blades act mainly as driving means which press the raw material against the walls of the trough(s) and mix it with the additional substances by spreading it over these walls. The blades are disposed mainly axially or helically on the driving rollers and cause a pressing- and kneading-action on the material, and consequently its stressing and heating which as a rule is very considerable. For these reasons neither accelerating nor vulcanising agents can be added to the mixture treated in such a manner, because the mixture would then vulcanise in the machine itself. Therefore the mixture is drained off from this machine into a mixing mill, such as described in the foregoing paragraph, in which it cools off. Only after it has reached a suitable temperature are the vulcanising and accelerating agents incorporated.

Thus this newest kneading process in kneading machines requires a subsequent cooling in a mixing mill. However, for the simplification of the operation various suggestions have been made including automatic transference from the kneading machine into the mixing mill, or arranging for the kneaded material to fall from the kneading machine, after an obturator wedge has been opened, under the influence of its own weight into a calender arranged underneath. A great disadvantage of these arrangements is that they add considerably to the weight and dimensions of the machine.

An object of the present invention is the development of an improved machine for the pretreatment of plastic materials, such as natural or artificial rubber and the like, in which occur the kneading and the mixing as well as the cooling of the material and the admixture of the vulcanising and accelerating agents.

A great advantage of the machine of the invention is in its compact arrangement which allows a much better utilisation of the space than do the two separate machines hitherto used, a separate transfer device from the kneading machine to the mixing mill being eliminated. Moreover, the production of the mixture in the machine is of the character of a flowing-motion operation, and consequently results in a more perfect and homogeneous mixture.

The subject matter of the present invention is a machine for pretreatment of plastic material in which the surface of one mixing roller forms, in the place of contact with the kneading chamber, a part of its inner surface.

The machine embodies a kneading section in which one or several kneading rollers are rotatably arranged so as to treat the material to be kneaded in known manner, and a mixing mill section having two or more rollers where the mixture is allowed to cool down and where the vulcanising and accelerating agents are admixed. It is important for the combination of these sections to provide for suitable transfer of the mass from the kneading section into the mixing mill section, i. e. into the bite of the mixing mill rollers. An arrangement has been found particularly suitable in which a wedge slide scrapes off the plastic mass from the surface of one mixing roller, and in which this same roller, after removal of the wedge, carries the kneaded mass from the kneading chamber into the working space of the mixing mill.

Thus a wedge slide is maintained in an inner position, while simultaneously two separated batches of material are treated in the kneading chamber and on the mixing rollers. At periodic intervals the wedge slide is withdrawn so as to allow the kneaded material to be transferred from the kneading chamber to the mixing rollers.

The kneading roller drives and spreads the kneaded mass by its blades over the walls of the kneading chamber and consequently also over the surface of the adjacent mixing mill roller. During the kneading operation it suffices to scrape the kneaded mass of the mixing mill roller by means of the knife edge of the wedge so that it is kept in the kneading chamber. When the kneaded mass is to pass from the kneading chamber, the mixture spread over the mixing mill roller is left on the latter, and is transferred into the working space of the mixing mill. Then, after the mixture has appropriately cooled down, suitable vulcanisation and accelerating agents can be admixed in the mixing mill, and after these have been appropriately worked-in and mixed, the finished mixture can be removed from the machine. In this manner a most rapid working operation of the machine is achieved with the minimum requirement of space.

In the accompanying drawings two machines according to the invention are shown by way of example.

Fig. 1 is a cross section through a machine having one kneading roller and two mixing mill rollers.

Fig. 2 is a view of the filler openings of the kneading section in Fig. 1.

Fig. 3 is a cross section of an alternative embodiment having two kneading rollers and two mixing mill rollers.

Fig. 4 is a perspective view of a preferred form of kneading roller.

Referring first more particularly to Figs. 1 and 2, numeral 1 denotes the frame of the machine to which the casing 2 of the kneading chamber is attached by means of bolts or in any other suitable manner. This casing is equipped (see especially Fig. 2) with a filler opening 3 for the plastic raw material and with an opening 4 for the pouring in of additional substances, if any. The opening 4 has one side wall running tangentially to the kneading chamber and is contracted in a downward direction whereby the penetration and packing of the kneaded mass into the said opening is prevented.

Since the plastic material 7 is strongly heated by the kneading it is convenient to divert the developed heat from the casing of the kneading chamber 2 by a coolant flowing between the ribs 5.

Within the kneading chamber 2 a kneading roller 6 is rotatably journalled, in the two lateral covers of the kneading chamber, which roller is driven either independently or from the mixing mill roller 8 by means of toothed gears. The shape of the kneading roller can be best seen from Fig. 4. The part A is developed in known manner in order to squash the raw material and to transport it from the filler opening 3 towards the part B. For this purpose the part A is equipped with helical ribs 26. By part B, where helical ribs 25 are provided with radial flanks which at some places do not reach as far as the walls of the kneading chamber, is brought about the kneading and the mixing of the plastic material with the additional substances introduced through the opening 4. By this disposition of the ribs 26, 25 the raw material is consequently first squashed right at the filler opening 3 and at once transferred to the region best suited for the kneading and the admixing of additional substances without being unnecessarily heated. According to the kind of mixture to be produced, the lengths of the parts A and B, and consequently also the ratio between the squashing and the kneading of the mixture, can be selected at will.

The kneading space provided in the kneading chamber 2 is only partly filled with the kneaded mass which, after being thoroughly kneaded, can be drained off between a scraper 10 and the mixing mill roller 8. The scraper 10 is arranged on a slide 9 and has the shape of an exchangeable knife. The slide 9 moves in a guide 11 and can be adjusted at will.

Beside the mixing mill roller 8 there is a second mixing mill roller 12, and between both of them the plastic material accumulates in the shape of a hump 13. By means of wedges 16 on the side walls of the machine a lateral escape of the plastic material is prevented. Screws 15 enable the following adjustments to be made; the position of the roller 12 with respect to the roller 8; the thickness of the layer of material on the roller 12; and the action of the mixing operation. Lest the mixture be carried away by the roller 8 as might happen in exceptional cases due to different temperatures of the roller surfaces, a scraper 18 is pressed against said roller which scraper is attached to a bracket 17 of the machine frame in any suitable manner. By this arrangement an obstruction of the gap between the roller 8 and the kneader casing 2 by the plastic material is safely prevented as is the carrying back of the worked through material into the kneading chamber.

For the treatment of bigger quantities of a plastic material, particularly of rubber, in a single machine, it is advantageous to employ two kneading rollers in order to speed up the kneading process. Fig. 3 shows such an arrangement with two kneader rollers 19, 20 and two mixing mill rollers 8, 12. The kneading chamber is here divided and comprises a lower portion 21 and an upper portion 22 which are bolted together or otherwise connected with one another. In this embodiment a single filler opening 4 suffices both for the plastic material and for the chemicals which opening may extend over the whole width of the machine. With this arrangement of the filler opening it is no longer necessary to make the rollers with separate parts for the squashing and for the transporting of the kneaded mass. The whole surface of each kneading roller is uniformly designed as an operative element for the kneading and mixing (similar to the part B of the roller in the previously described embodiment). In view of the more extensive heat dispersal necessary because of the bigger quantity of the kneaded mass, the double kneading chamber according to Fig. 3 is provided with special cooling chambers 23, 24 for an appropriate coolant. By control of the quantity and temperature of the coolant flowing therethrough, any desired regulation of the temperature of the kneaded mass can be effected. Otherwise the machine according to Fig. 3 works exactly in the same way as the machine according to Fig. 1. The components corresponding to one another in the two embodiments are therefore denoted by the same reference numerals.

We claim:

1. A machine for the pretreatment of plastic materials, comprising a casing forming a circular kneading chamber, a kneader roller rotatably arranged in said kneading chamber, rotatable mixing rollers disposed adjacent said chamber, the surface of one of the mixing rollers being tangent to the wall of said kneading chamber, and a wedge slide contacting and scraping off the plastic mass from the surface of said last mentioned mixing roller.

2. A machine for the pretreatment of plastic materials, comprising a casing forming a circular kneading chamber, a kneader roller rotatably arranged in said kneading chamber, rotatable mixing rollers disposed adjacent said chamber, the surface of one of the mixing rollers being tangent to the wall of said kneading chamber, and a wedge slide contacting and scraping off the plastic mass from the surface of said last mentioned mixing roller, the last mentioned mixing roller operating also to transfer the kneaded mass from the kneading chamber into the bite of the mixing rollers.

3. A machine for the pretreatment of plastic materials, comprising a casing forming a circular kneading chamber, a kneader roller rotatably arranged in said kneading chamber, and adjacent rotatable mixing rollers cooperating with said kneader roller, said casing having two separated filler openings leading to the kneading chamber, one for the plastic material and the other for additional substances, one side wall of the last mentioned opening extending tangentially to the circumference of the kneading chamber, said opening being contracted in the direction towards said chamber, the surface of one of the mixing rollers contacting said kneading chamber, and a wedge slide contacting and scraping off the plastic material from the surface of said last mentioned mixing roller.

4. A machine for the pretreatment of plastic materials, comprising a casing forming a circular kneading chamber, a kneader roller rotatably arranged in said kneading chamber, and adjacent rotatable mixing rollers cooperating with said kneader roller, said casing having two separated filler openings, one for the plastic material and the other for additional substances, one side wall of the last mentioned opening extending tangentially to the circumference of the kneading chamber, said opening being contracted in the direction towards said chamber, the surface of one of the mixing rollers being tangent to the wall of said kneading chamber, and a wedge slide contacting and scraping off the plastic material from the surface of said last mentioned mixing roller, the last mentioned mixing roller operating also to transfer the kneaded mass from the kneading chamber into the bite of the mixing rollers.

5. A machine for the pretreatment of plastic materials, comprising a casing forming a circular kneading chamber, a kneader roller rotatably arranged in said kneading chamber, and a pair of adjacent rotatable mixing rollers cooperating with said kneader roller, the surface of one of the mixing rollers being tangent to the wall of said kneading chamber, and a wedge slide cooperating with said last mentioned mixing roller and operating to scrape off the plastic material from the surface of said mixing roller.

6. A machine as set forth in claim 5 in which the last mentioned mixing roller also operates to transfer the kneaded mass from the kneading chamber into the bite of the mixing rollers.

ALOIS BÁNOVSKÝ.
ARNOŠT KRUŽÍK.

REFERENCES CITED

The following references are of record in the file of this patent:

UNITED STATES PATENTS

| Number | Name | Date |
| --- | --- | --- |
| 1,406,666 | Lehmann | Feb. 14, 1922 |
| 1,513,733 | Banbury | Nov. 4, 1924 |